United States Patent
Bezold et al.

(10) Patent No.: US 9,885,428 B2
(45) Date of Patent: Feb. 6, 2018

(54) MAGNET VALVE COIL UNIT FOR A MAGNET VALVE AND METHOD OF MANUFACTURING A MAGNET VALVE COIL UNIT

(71) Applicant: BUERKERT WERKE GMBH, Ingelfingen (DE)

(72) Inventors: Christian Bezold, Weissbach (DE); Daniel Bierut, Kuenzelsau (DE); Martin Hettinger, Ingelfingen (DE); Sebastian Kahl, Forchtenberg (DE); Ottmar Mueller, Doerzbach-Laibach (DE); Christian Weber, Kupferzell (DE)

(73) Assignee: BUERKERT WERKE GMB (DE)

( * ) Notice: Subject to any disclaimer, the term of this patent is extended or adjusted under 35 U.S.C. 154(b) by 211 days.

(21) Appl. No.: 14/639,696

(22) Filed: Mar. 5, 2015

(65) Prior Publication Data
US 2015/0252912 A1    Sep. 10, 2015

(30) Foreign Application Priority Data

Mar. 5, 2014 (DE) ................. 10 2014 102 937

(51) Int. Cl.
*F16K 37/00* (2006.01)
*F21V 8/00* (2006.01)
(Continued)

(52) U.S. Cl.
CPC ...... *F16K 37/0058* (2013.01); *F16K 31/0675* (2013.01); *G02B 6/0001* (2013.01);
(Continued)

(58) Field of Classification Search
CPC ............. F15B 13/0864; F16K 37/0025; F16K 37/0033; F21V 2200/10; F21V 2200/13; G02B 6/0001; H01F 41/0206
See application file for complete search history.

(56) References Cited

U.S. PATENT DOCUMENTS 5,062,807 A * 11/1991 Guss, III ............. H01R 13/717
340/815.76
5,518,028 A * 5/1996 Walker ................ F16K 37/0033
137/554
(Continued)

FOREIGN PATENT DOCUMENTS

DE       20004747      6/2000     ............. F15B 13/00
EP       0715107       6/1996     ............. F16K 31/06
(Continued)

OTHER PUBLICATIONS

English machine translation of EP0952357 and EP1508732 from Espacenet.*

(Continued)

*Primary Examiner* — Jong-Suk (James) Lee
*Assistant Examiner* — Zheng Song
(74) *Attorney, Agent, or Firm* — Hayes Soloway P.C.

(57) ABSTRACT

A magnet valve coil unit includes a magnet coil and a circuit board connected thereto, encased by a molding material. An LED on the circuit board signals a switching status of the magnet coil. The LED is surrounded by the molding material at least in part. A light guide element is arranged in contact with the LED such that it directs light radiated from the LED to an external surface of the magnet valve coil unit. The magnet valve coil unit is manufactured by applying a deformable, transparent mass on the LED of a pre-assembled component containing the magnet coil and the circuit board on which the LED is arranged, and placing the pre-assembled component in a tool mold. The light guide (Continued)

element is arranged to be in contact with the transparent mass, and the pre-assembled component is encased with a molding material.

10 Claims, 6 Drawing Sheets

(51) Int. Cl.
    *H01F 5/00*     (2006.01)
    *H01F 7/06*     (2006.01)
    *H01F 41/02*     (2006.01)
    *F16K 31/06*     (2006.01)

(52) U.S. Cl.
    CPC ............. *H01F 5/003* (2013.01); *H01F 7/064* (2013.01); *H01F 41/0206* (2013.01); *F21V 2200/00* (2015.01); *Y10T 29/4902* (2015.01)

(56) References Cited

U.S. PATENT DOCUMENTS

| | | | | |
|---|---|---|---|---|
| 5,588,465 | A * | 12/1996 | Witowski | F15B 13/0402 137/596.16 |
| 6,142,182 | A * | 11/2000 | Akimoto | F15B 13/0817 137/625.64 |
| 6,450,198 | B1 * | 9/2002 | Bouteille | F15B 13/0405 137/596.17 |
| 6,595,674 | B1 * | 7/2003 | Yoneda | G01N 21/8806 362/551 |
| 6,786,238 | B2 | 9/2004 | Frisch | 137/625.65 |
| 6,840,273 | B2 * | 1/2005 | Miyazoe | F15B 13/0402 137/315.03 |
| 2010/0033340 | A1 * | 2/2010 | Bogdanowicz | F16K 37/0058 340/815.43 |
| 2011/0176781 | A1 * | 7/2011 | Matsuo | H01L 31/0203 385/92 |

FOREIGN PATENT DOCUMENTS

| | | | | |
|---|---|---|---|---|
| EP | | 0952357 | * 10/1999 | ......... F15B 13/0853 |
| EP | | 1371888 | 12/2003 | ............. F16K 31/06 |
| EP | | 1508732 | 1/2006 | ............. F16K 27/00 |
| WO | WO2008/138373 | | * 11/2008 | |
| WO | WO2008138373 | | 11/2008 | ............. F15B 13/08 |

OTHER PUBLICATIONS

English Machine Translation of WO 2008/138373 from Espacenet.*
German Search Report issued in application No. 10 2014 102 937.2, dated Mar. 13, 2014 (5 pgs).

* cited by examiner

MAGNET VALVE COIL UNIT FOR A MAGNET VALVE AND METHOD OF MANUFACTURING A MAGNET VALVE COIL UNIT

FIELD OF THE INVENTION

The invention relates to a magnet valve coil unit for a magnet valve as well as to a method of manufacturing a magnet valve coil unit.

BACKGROUND

Magnet valve coil units are used for switching magnet valves. Here, it is favorable to be able to identify the current switching status of the magnet coil. For this reason, indicator elements are frequently employed in the form of an LED which displays whether the coil is currently fed with electric power or not.

These indicator elements are usually arranged on the outside of the magnet valve coil unit. In EP 0 715 107 B1, for instance, it is suggested to accommodate a light emitting diode (LED) in a plug housing for the magnet coil. It is known from EP 1 371 888 B1 to arrange an LED within an attached, partially transparent magnet coil housing.

However, the magnet coils of the magnet valve coil units are frequently encased by a normally opaque molding material in order to improve the heat dissipation toward the surroundings. In doing so, the magnet coil is encapsulated for instance with an epoxy resin by a pressing process, the molding material forming substantially also the outside of the magnet valve coil unit.

It is the object of the invention to provide a switching status indicator which can be easily integrated in the magnet valve coil unit even in such a case.

SUMMARY

According to the invention, provision is made in a magnet valve coil unit comprising a magnet coil and a circuit board connected thereto, which are encased by a molding material, that an LED is arranged on the circuit board, said LED signaling a switching status of the magnet coil and being surrounded by the molding material at least in part. A light guide element is provided which is arranged to be in contact with the LED such that it directs light radiated from the LED to an external surface of the magnet valve coil unit.

In this context, the term "encased by the molding material" means that the parts in question are covered with the molding material in a casting or pressing process, for example, and that at least the magnet coil and the circuit board are embedded in the molding material at least in sections.

Due to using the light guide element, it is possible to arrange the LED directly on the circuit board (which comprises the circuitry for actuating the magnet coil) in a space-saving manner and with favorable conditions in terms of process technology, although the circuit board is situated within the magnet valve coil unit and surrounded by the molding material. It is only required to lay a light guide element from the LED to the outside of the magnet valve coil unit, so that the light from the LED can be perceived from outside.

A transparent mass is preferably arranged between the LED and the light guide element, said transparent mass being deformable at least during encasing with the molding material. The transparent mass provides a direct contact between the LED and the light guide element in order to ensure a sufficient light transmission from the LED to the light guide element. In addition, using the transparent mass allows to achieve a compensation of tolerances between the LED and the light guide element, so that varying gap widths between the LED and the light guide element do not have an adverse effect.

The transparent mass is a silicone or an adhesive, for example, and in particular a UV adhesive can be used.

In a first preferred embodiment, the light guide element is a female plug which is transparent at least in sections. This design is suited for magnet valve coil units which are contacted by means of a plug. As the female plug is visible from outside by necessity, this is a simple way of guiding light from the LED on the circuit board to the external surface of the magnet valve coil unit. The switching status of the magnet coil can be read off by means of the light radiation of the female plug, in particular also by means of the color of the light or the twinkling of the lighting. It is preferred that the female plug is directly connected to the circuit board.

In a second preferred embodiment, the light guide element is a cable feedthrough which is transparent at least in sections. This embodiment lends itself if the magnet valve coil unit is not contacted by means of a plug, but if there are connecting cables which project from the magnet valve coil unit. The cable feedthrough preferably extends from the external surface of the magnet valve coil unit to the circuit board, while the cables originating from the circuit board leave the magnet valve coil unit through the cable feedthrough.

In a third preferred embodiment, the light guide element is a transparent indicator member which extends up to the external surface of the magnet valve coil unit. In this case, an insertion opening is kept clear during encasing the magnet coil and the circuit board with the molding material, and the indicator member is inserted in said insertion opening after the hardening of the molding material.

It may be advantageous if the indicator member protrudes at least in sections from the external surface of the magnet valve coil unit surrounding it, so that the switching status can be detected by the radiated light also from the side.

However, it is also possible to integrate the indicator member in the magnet valve coil unit in such a manner that it fits in the external surface so as to be flush with it.

The mentioned problem is also solved by a method of manufacturing a magnet valve coil unit, in particular a magnet valve coil unit as it has been described above. A deformable, transparent mass is applied on an LED of a pre-assembled component comprising a magnet coil and a circuit board on which the LED is arranged. The pre-assembled component is placed in a tool mold. A light guide element is arranged so as to be in contact with the transparent mass. The pre-assembled component is encased with a molding material.

In a first possible embodiment, the light guide element employed is for instance a female plug or cable feedthrough which is transparent at least in sections and is connected to the circuit board, for example plugged onto it. The deformable, transparent mass is introduced into the intermediate space between the LED and the light guide element, so that it fills the intermediate space. After this step, the pre-assembled component is encased with the molding material; in this process, the later external surface of the magnet valve coil unit is produced. The female plug or the cable feedthrough extends at least to the external surface and may also protrude from the molding material to some extent, so that light radiated from the LED is visible from outside the magnet valve coil unit.

In another possible embodiment, the light guide element is inserted only after encasing the pre-assembled component with the molding material. During the encasing process, an insertion opening above the LED is kept free from any molding material by a tool element, for instance a die firmly disposed in the tool. Only after hardening of the molding material, an indicator member is inserted in the insertion opening. The deformable, transparent mass should be applied on the LED already prior to encasing with the molding material, so that the transparent mass is able to compensate for a tolerance-induced gap between the LED and the die and to prevent the molding material from flowing into this gap. To this end, it is of advantage to apply the deformable, transparent mass in excess, with the surplus of the transparent mass being displaced during the encasing process by the die and/or the molding material.

DETAILED DESCRIPTION

Figure 1:
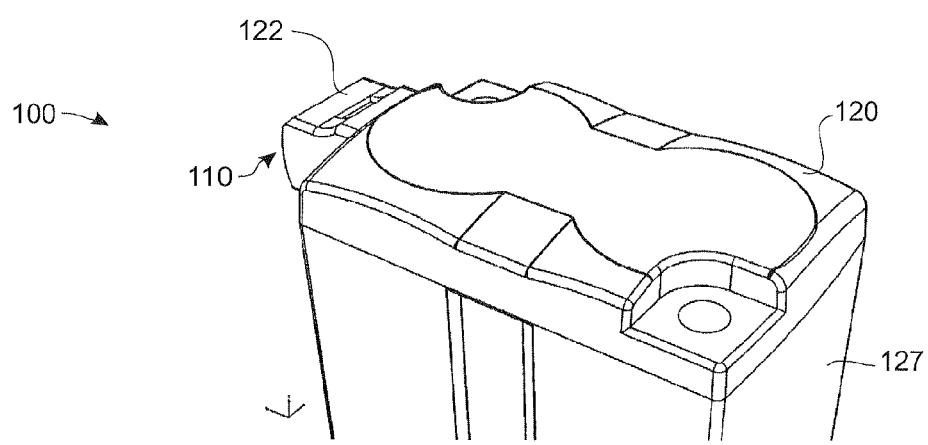
FIG. 1 is a schematic perspective illustration of a magnet valve coil unit of the invention according to a first embodiment.

FIG. 1 shows a magnet valve coil unit 100 for a magnet valve, not shown in further detail, according to a first embodiment.

Figure 2:
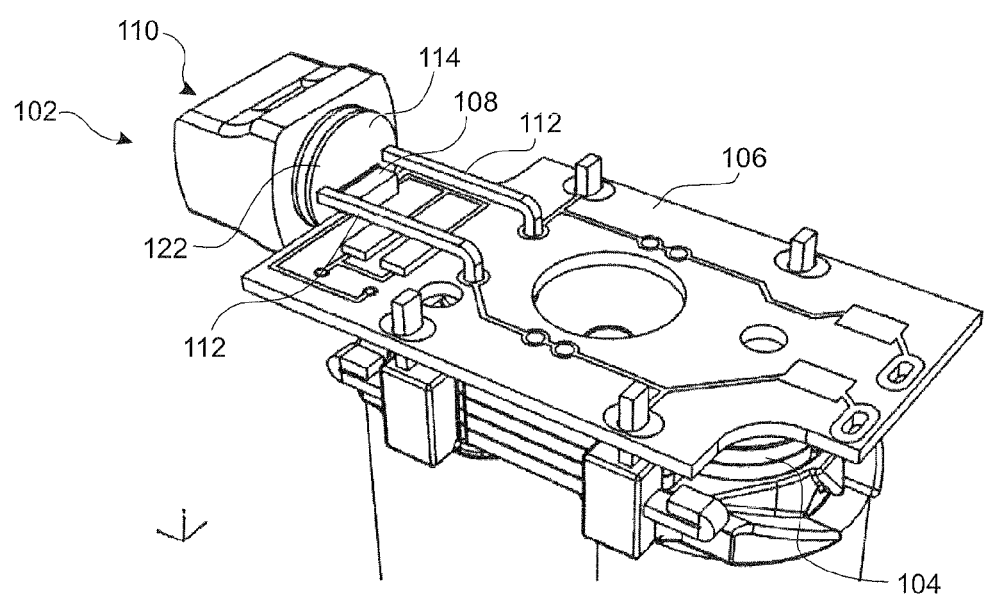
FIG. 2 is a schematic perspective illustration of a pre-assembled component of the magnet valve coil unit of FIG. 1 comprising a magnet coil and a circuit board and a female plug.
Figure 3:
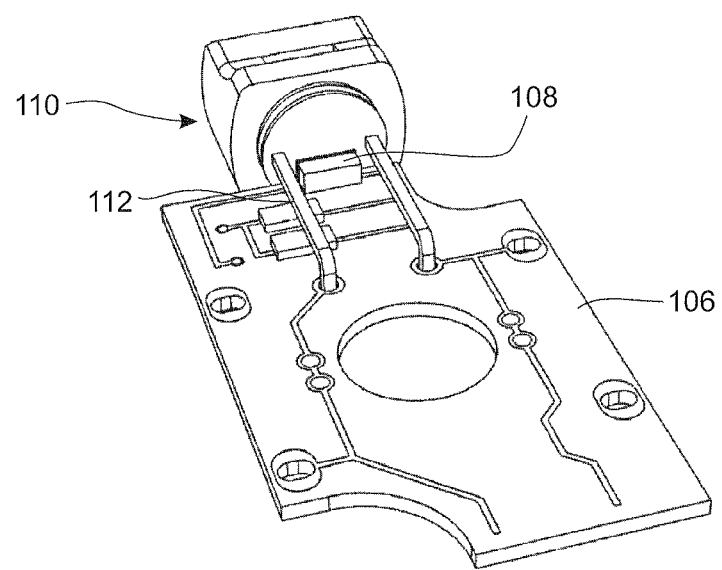
FIG. 3 is a schematic perspective illustration of the circuit board and the female plug of FIG. 2.
Figure 4:
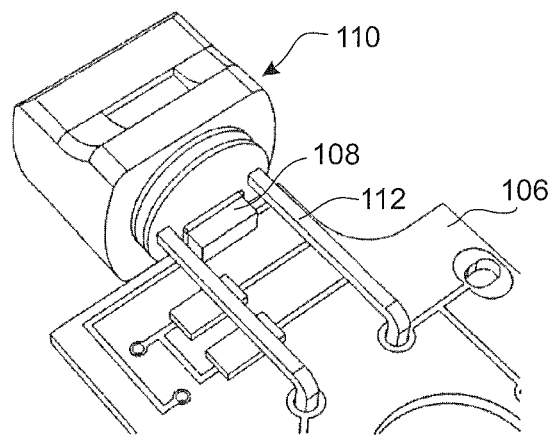
FIG. 4 shows an enlarged detail of FIG. 3.
Figure 5:
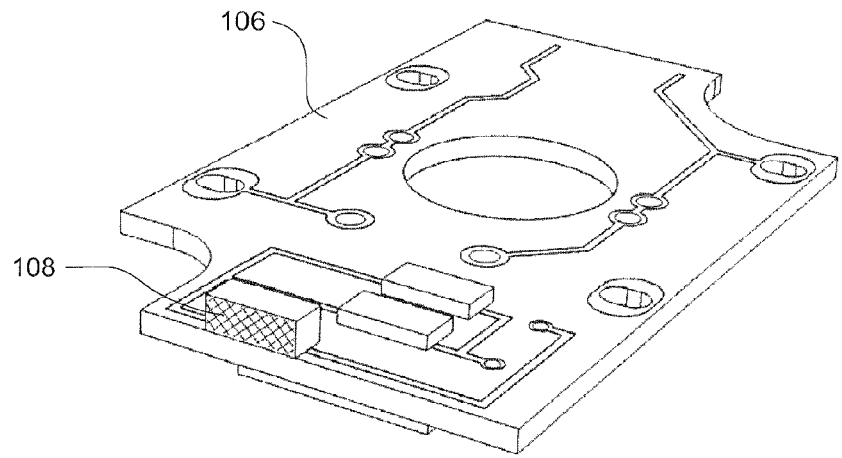
FIG. 5 is a schematic perspective illustration of the circuit board of FIG. 2.

As is shown in FIG. 2, the interior of the magnet valve coil unit 100 houses a pre-assembled component 102 which includes an indicated magnet coil 104 and a circuit board 106 connected thereto. Arranged on the circuit board 106 are the usual electronic members and circuits for actuating the magnet coil 104, which are not explained in more detail here.

An LED 108 is also mounted on the circuit board 106. In this example, also the circuits for driving the LED are arranged on the circuit board 106. In this embodiment, the LED 108 is situated on a narrow side of the circuit board 106 where also a female plug 110 is arranged.

Figure 6:
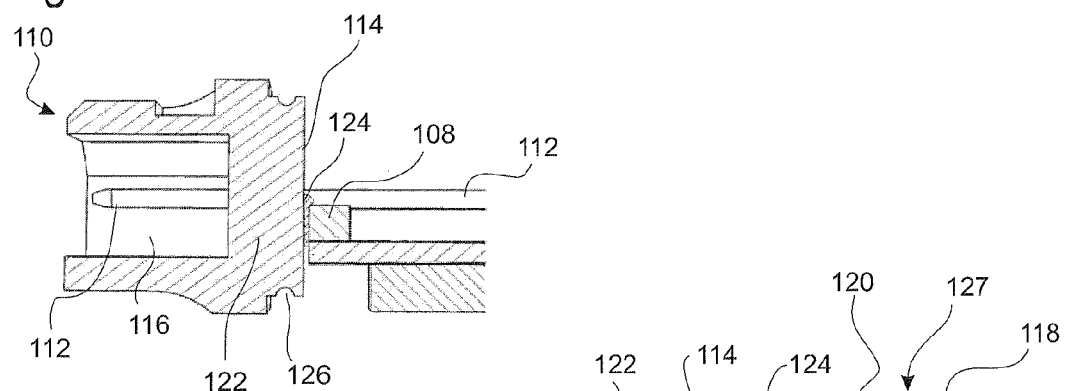
FIG. 6 is a schematic sectional view of a portion of the circuit board as well as of the female plug of FIG. 2.
Figure 7:
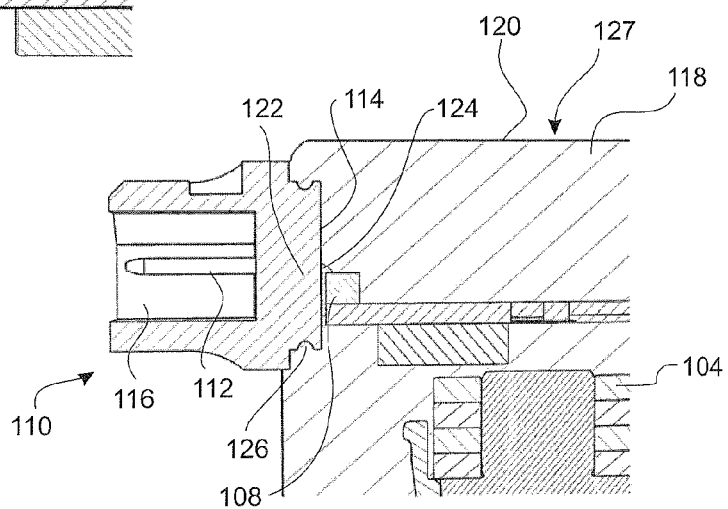
FIG. 7 is a schematic sectional view of a portion of the magnet valve coil unit of FIG. 1.

Two connecting pins 112 for establishing an electric contact extend from the circuit board 106 through a rear side 114 of the female plug 110 into a plug receptacle 116 of the female plug 110 (see FIGS. 6 and 7).

The female plug 110 may be initially connected to the circuit board 106 by pushing it onto the connecting pins 112, for example, but a fixed connection could be provided as well.

For manufacturing the magnet valve coil unit 100, the component 102 is encased with a hardenable molding material 118. The opaque, lightproof molding material 118 surrounds the magnet coil 104 and the circuit board 106 substantially in full, as can be seen in FIG. 7. The female plug 110, however, protrudes for the most part from the molding material 118 in this example.

After hardening, the molding material 118 also defines the outer contour and in this example is part of an external surface 120 of the magnet valve coil unit 100. An additional housing surrounding the molding material 118 is not provided here, but decorative elements and the like may be applied on the external surface 120, of course.

In order to guide the light of the LED 108 to the external surface 120 of the magnet valve coil unit 100, a light guide element 122 is provided which creates a transparent connection from the LED 108 to the external surface 120 of the magnet valve coil unit 100. In this first exemplary embodiment, the light guide element 122 is defined by a transparent portion of the female plug 110.

If the LED 108 lights up, light is guided towards outside via the light guide element 122, and a switching status of the magnet coil 104 can be read off. The electronic circuitry of the LED 108 required for this can be designed in known way and may be arranged on the circuit board 106.

In this example, substantially the whole female plug 110 is made from a transparent material such as a suitable plastic. It would also be conceivable, however, to realize the female plug 110 so as to be transparent only in sections.

In order to improve the conduction of light and ensure a reliable contact between the LED 108 and the light guide element 122, a transparent mass 124 is provided between the LED 108 and the light guide element 122, here the rear side 114 of the female plug 110. The transparent mass 124 completely fills the gap between the LED 108 and the light guide element 122, so that an undisturbed light transfer from the LED 108 to the light guide element 122 is ensured.

The diffraction index of the transparent mass 124 preferably corresponds approximately to that one of the outer shell of the LED 108 and that one of the light guide element 122, to allow a largely undisturbed light propagation.

The transparent mass 124 is deformable at least for the time when it is being applied and in these examples remains elastic to a certain extent throughout the entire life cycle of the magnet valve coil unit 100. In this example, the transparent mass 124 is a transparent silicone.

During manufacturing the magnet valve coil unit 100, the transparent mass 124 is first introduced between the LED 108 and the rear side 114 of the female plug 110. Subsequently, the component 102 is placed in a (not illustrated) tool mold. Next, the molding material 118 is filled into the tool mold and the component 102 is encased with the molding material 118 in a casting or pressing process. In this example, the molding material 118 completely encloses the circuit board 106 and the LED 108 except for the connection between the LED 108 and the light guide element 122. The transparent mass 124, however, keeps the gap between the LED 108 and the light guide element 122 free from any molding material 118.

The female plug 110 is firmly anchored in the molding material 118 and the body 127 of the magnet valve coil unit 100 by means of a positive-locking fit between a groove 126 on the female plug 110 and the molding material 118 filling the groove 126.

Figure 8:
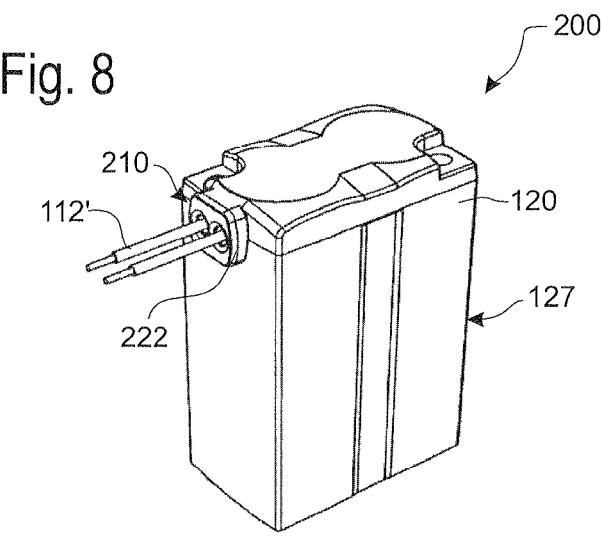
FIG. 8 is a schematic perspective illustration of a magnet valve coil unit according to a second embodiment of the invention.
Figure 9:
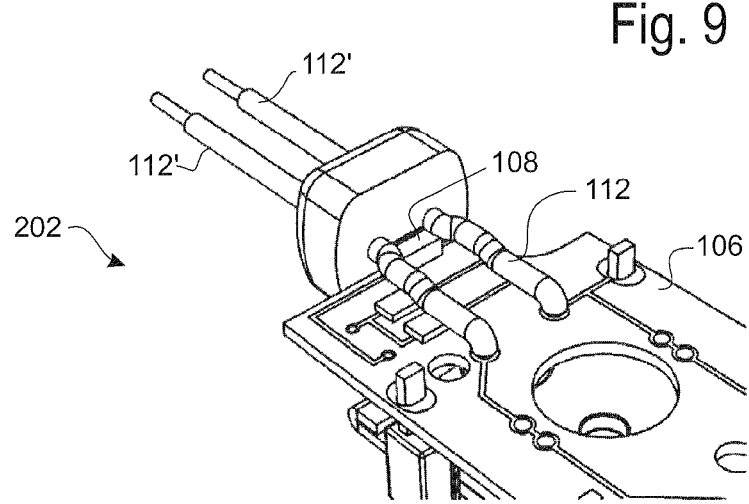
FIG. 9 is a schematic perspective illustration of a component comprising a magnet coil, a circuit board as well as a cable feedthrough of the magnet valve coil unit of FIG. 8.
Figure 10:
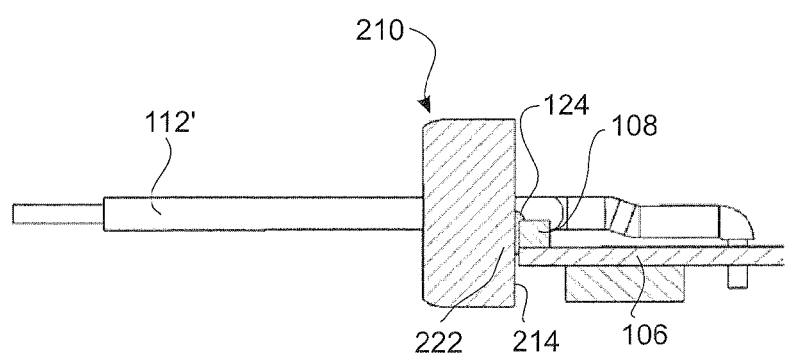
FIG. 10 is a schematic sectional view of a portion of the circuit board as well as of the cable feedthrough of FIG. 9.
Figure 11:
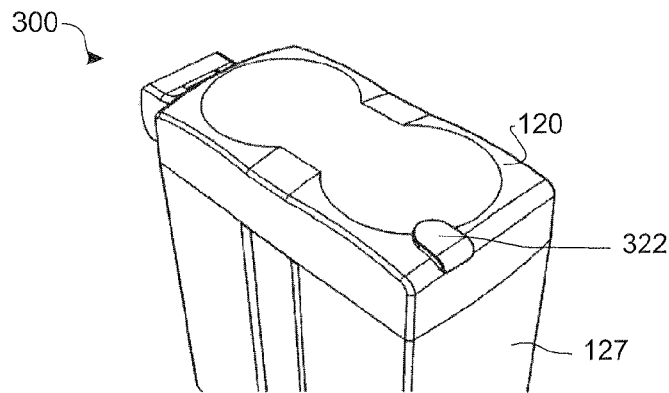
FIG. 11 is a schematic perspective illustration of a magnet valve coil unit of the invention according to a third embodiment.
Figure 12:
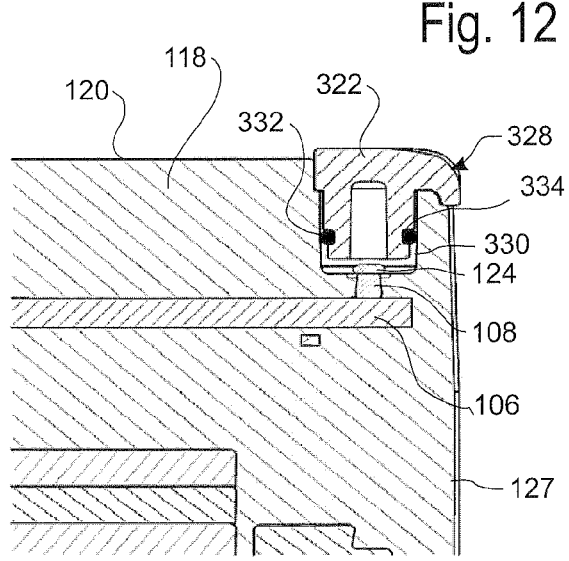
FIG. 12 is a schematic sectional view of the magnet valve coil unit of FIG. 11.
Figure 13:
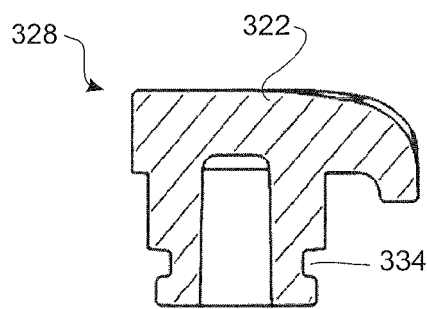
FIG. 13 is a schematic perspective illustration of a light guide element of the magnet valve coil unit of FIG. 12.

FIGS. 8 to 10 show a second embodiment of a magnet valve coil unit 200. For already known component parts, the already introduced reference numerals are used again.

In contrast to the magnet valve coil unit 100 just described, a cable feedthrough 210 is provided instead of a female plug, and electrical connecting wires 112' extend towards outside through the cable feedthrough 210. In this case, the cable feedthrough 210 is designed to be transparent as a whole or in sections and serves as a light guide element 222.

The cable feedthrough 210 has its rear side 214 attached to the LED 108, the intermediate space between the LED 108 and the cable feedthrough 210 being filled up by a sufficient amount of the transparent mass 124. As described with respect to the first embodiment, the component 202 including the magnet coil 104, the circuit board 106 and the cable feedthrough 210 is substantially completely coated with the molding material 118 during the manufacture of the magnet valve coil unit 200.

As an alternative to silicone, a transparent adhesive such as a UV adhesive may also be used in the described examples as the transparent mass 124, which adhesive is introduced between the female plug 110 or the cable feedthrough 210 and the LED 108 and then hardened by irradiating it with UV light. The application of the adhesive is carried out prior to placing the component 102, 202 in the tool mold.

In both embodiments, the light emission of the female plug or the cable feedthrough 210 allows to read out the switching status of the magnet coil 104.

In a third embodiment shown in FIGS. 11 to 15, an indicator element 328 is provided in a front area of the top of the magnet valve coil unit 300.

In this case, the LED 108 is arranged on the circuit board 106 near the narrow side of the circuit board 106 facing away from the female plug or the cable feedthrough.

In order to achieve a guidance of light to the external surface 120 of the magnet valve coil unit 300, the indicator member 328 is formed as a light guide element 322. Here, the indicator member 328 is a transparent plastic cap which is separate from the body 127 of the magnet valve coil unit 300 and inserted in an insertion opening 330 which is recessed in the body 127 of the magnet valve coil unit 300 in the hardened molding material 118.

The LED 108 may either protrude into the insertion opening 330 or be arranged such that its light is emitted into the insertion opening 330. The light is then guided to the external surface 120 of the magnet valve coil unit 300 through the body of the indicator member 328 acting as a light guide element 322.

In this example, the indicator member 328 protrudes from the surrounding external surface 120 of the top of the magnet valve coil unit 300 by approximately 1 to 2 mm, so that the light radiated from the LED 108 can also be perceived from the side. It would also be possible, however, to insert the external surface of the indicator member 328 so as to be flush with the external surface 120 of the magnet valve coil unit 300.

In order to achieve a tight connection between the indicator member 328 and the wall of the insertion opening 330, a seal 332 in the form of an O-ring is provided. The seal 332 is received in a groove 334 of the indicator member 328.

The indicator member 328 may also be glued into the insertion opening 330, the adhesive penetrating into the groove 334 during insertion. In this case, the groove 334 serves for interlocking the body 127 with the hardened adhesive.

During the manufacture of the magnet valve coil unit 300, the insertion opening 330 is kept free from any molding material 118 by a die of the tool during encasing the component made up of the circuit board 106 and the magnet coil 104.

When the molding material 118 has been hardened, the indicator member 328 is inserted in the insertion opening 330.

The transparent mass 124 is applied on or around the LED 108 already prior to encasing with the molding material 118, in particular prior to placing the pre-assembled component in the tool mold, in order to keep the LED 108 free from any molding material 118. The transparent mass 124 is dispensed in a somewhat higher amount than needed, so that a surplus which is displaced by the die of the tool reliably ensures that any tolerances between the LED 108 and the die are balanced out and essential radiation surfaces of the LED 108 are kept free from any molding material 118.

Figure 14:
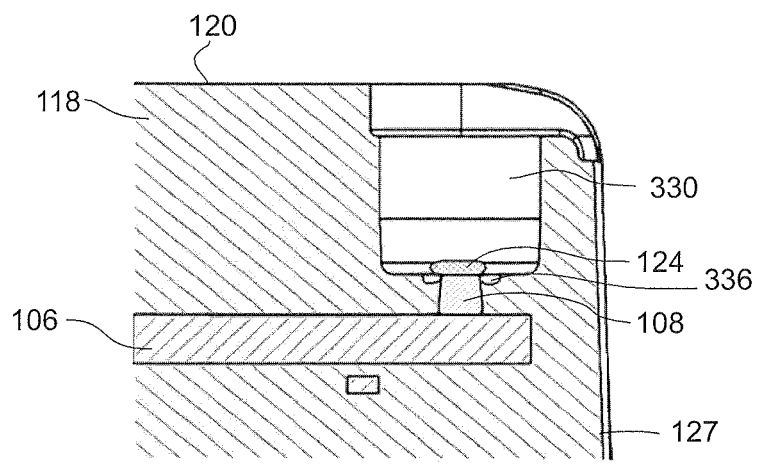
FIG. 14 is a schematic sectional view of a portion the magnet valve coil unit of FIG. 11 prior to inserting the light guide element.

In the example of FIG. 14, the unobstructed area is substantially limited to the top of the LED 108 and small pockets 336 beside the top, which are created by the transparent mass 124 being displaced by the die during encasing with the molding material 118.

Figure 15:
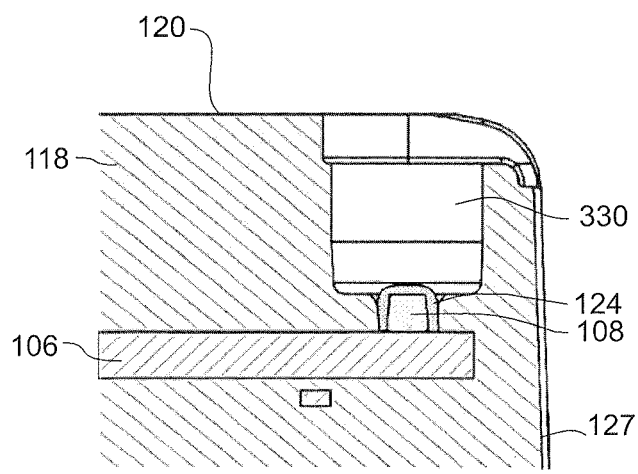
FIG. 15 is a schematic sectional view of a portion of the magnet valve coil unit of FIG. 11 prior to inserting the light guide element in a variant.

In the example of FIG. 15, the LED is surrounded by the transparent mass 124 on its entire irradiating surface area and kept free from any molding material 118.

The individual features of the various embodiments can be freely interchanged and combined with one another at the discretion of a person skilled in the art. It would be possible, for example, to provide a light-conducting indicator member at another place of the external surface of the magnet valve coil unit in addition to a light-conducting female plug.

The invention claimed is:

1. A magnet valve coil unit comprising a magnet coil and a circuit board connected thereto, the magnet coil and the circuit board being encased by and in direct contact with a molding material, so that the magnet coil is at least partly embedded in the molding material and covered at least partly with the molding material, and an LED being arranged on the circuit board, said LED signaling a switching status of the magnet coil, and a light guide element being provided which is arranged to be in contact with the LED such that the light guide element directs light radiated from the LED to an external surface of the magnet valve coil unit, wherein the circuit board and the LED are completely embedded in the molding material except for a connection between the LED and the light guide element.

2. The magnet valve coil unit according to claim 1, wherein a transparent mass is arranged between the LED and the light guide element, said transparent mass being deformable at least during encasing with the molding material.

3. The magnet valve coil unit according to claim 2, wherein the transparent mass is one of a silicone and an adhesive.

4. The magnet valve coil unit according to claim 1, wherein the light guide element is a transparent indicator member which extends up to the external surface of the magnet valve coil unit.

5. The magnet valve coil unit according to claim 4, wherein the indicator member protrudes at least in sections from the external surface of the magnet valve coil unit.

6. A magnet valve coil unit comprising a magnet coil and a circuit board connected thereto, the magnet coil and the circuit board being encased by a molding material so that the magnet coil and the circuit board are at least partly embedded in the molding material, and an LED being arranged on the circuit board, said LED signaling a switching status of the magnet coil and being surrounded by the molding material at least in part, and a light guide element being provided which is arranged to be in contact with the LED such that the light guide elements directs light radiated from the LED to an external surface of the magnet valve coil unit, the light guide element being a female plug protruding from the molding material and being at least partially transparent.

7. The magnet valve coil unit according to claim 6, wherein the female plug is firmly anchored in the molding material by a positive-locking fit between the female plug and the molding material.

8. The magnet valve coil unit according to claim 7, wherein the positive-locking fit is between a groove on the female plug and the molding material filling the groove.

9. A magnet valve coil unit comprising a magnet coil and a circuit board connected thereto, the magnet coil and the circuit board being encased by a molding material so that the magnet coil and the circuit board are at least partly embedded in the molding material, and an LED being arranged on the circuit board, said LED signaling a switching status of the magnet coil and being surrounded by the molding material at least in part, and a light guide element being provided which is arranged to be in contact with the LED such that the light guide element directs light radiated from the LED to an external surface of the magnet valve coil unit the light guide element being a cable feedthrough which is at least partially transparent, and electrical connecting wires extending towards an outside of the magnet valve coil unit from the circuit board through the cable feedthrough.

10. The magnet valve coil unit according to claim 9, wherein a rear side of the cable feedthrough is attached to the LED, the magnet coil, the circuit board and the cable feedthrough being substantially coated with the molding material.

* * * * *